Oct. 4, 1960     J. M. THORSÉN     2,955,284
PULSE-ECHO SYSTEM FOR RECORDING THE LOCATION OF REMOTE OBJECTS
Filed Jan. 7, 1958     3 Sheets-Sheet 1

INVENTOR
JARL MORANNAR THORSÉN

BY Hame and Nydick
ATTORNEYS

Oct. 4, 1960  J. M. THORSÉN  2,955,284
PULSE-ECHO SYSTEM FOR RECORDING THE LOCATION OF REMOTE OBJECTS
Filed Jan. 7, 1958  3 Sheets-Sheet 2

INVENTOR
JARL MORANNAR THORSÉN

By Hane and Nydick
ATTORNEYS

INVENTOR
JARL MORANNAR THORSÉN
ATTORNEYS

United States Patent Office

2,955,284
Patented Oct. 4, 1960

2,955,284

PULSE-ECHO SYSTEM FOR RECORDING THE LOCATION OF REMOTE OBJECTS

Jarl Morannar Thorsén, Hagersten, Sweden, assignor to Telefonaktiebolaget L M Ericsson, Stockholm, Sweden, a corporation of Sweden Filed Jan. 7, 1958, Ser. No. 707,615

Claims priority, application Sweden Jan. 9, 1957

4 Claims. (Cl. 343—11)

The present invention relates to a pulse-echo system, and more exactly to a system for permanently recording the location of remote objects in reference to the system. For instance, for observing navigation objects there are radar equipments on board of a ship. On the radar screens of these radar equipments an actual view of the surroundings of a ship can be obtained, but this view lasts only a few seconds and cannot be referred to later on. This disadvantage is eliminated by the system according to the invention which comprises a recording carrier consisting of a current sensible foil movable between a number of concentric, and electrically conductive rings, which are situated in the same plane, and an indicator driven with constant velocity and synchronously with a sending antenna in the radar station, the turning axis of said indicator being coaxial with the center point of the concentric rings. The system further comprises a counting circuit with a number of steps, which steps are connected each to a ring of said rings and are arranged one at a time and in a cyclic sequence to feed a pulse to the pertaining ring, a potential difference suitable for the registration on the recording carrier arising between the ring and the indicator, a pulse generator for feeding said counting circuit with pulses, and an input circuit arranged to receive a radar pulse emitted by the radar station for starting said feeding of pulses to the counting circuit and to receive an echo pulse caused by said radar pulse for terminating said feeding of pulses to the counting circuit.

Figure 1:
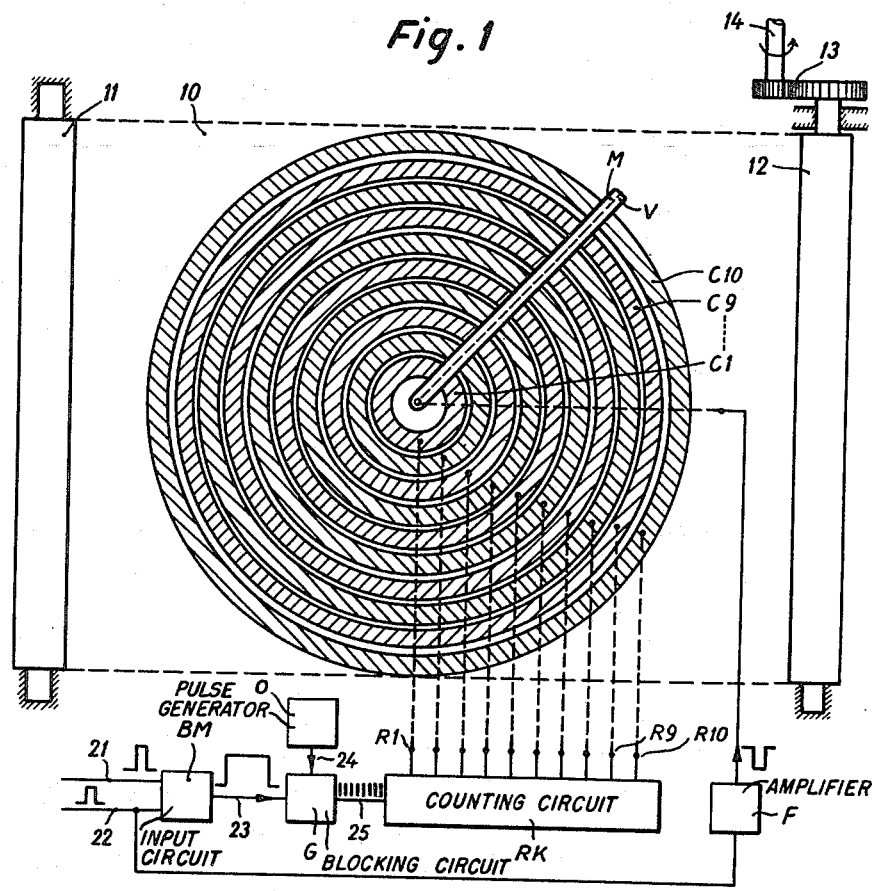
Figure 2:
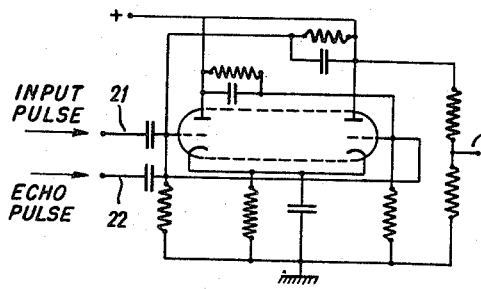
Figure 3:
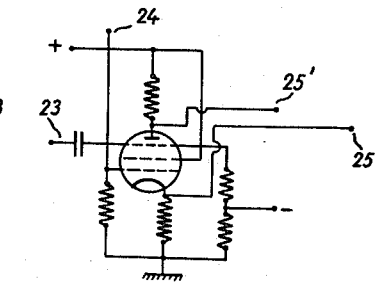
Figure 4:
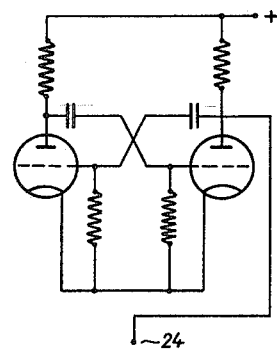
Figure 5:
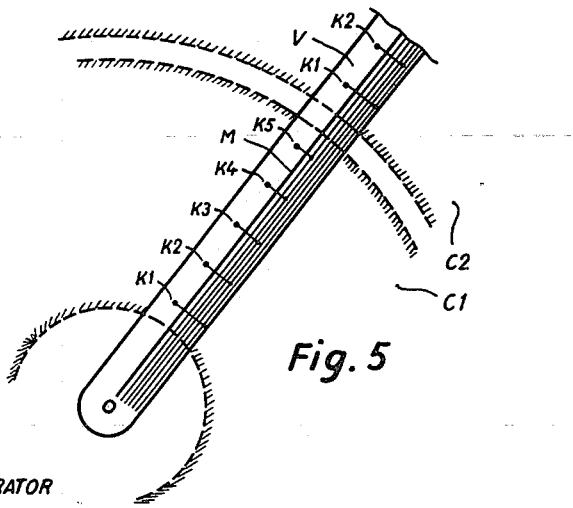
Figure 6:
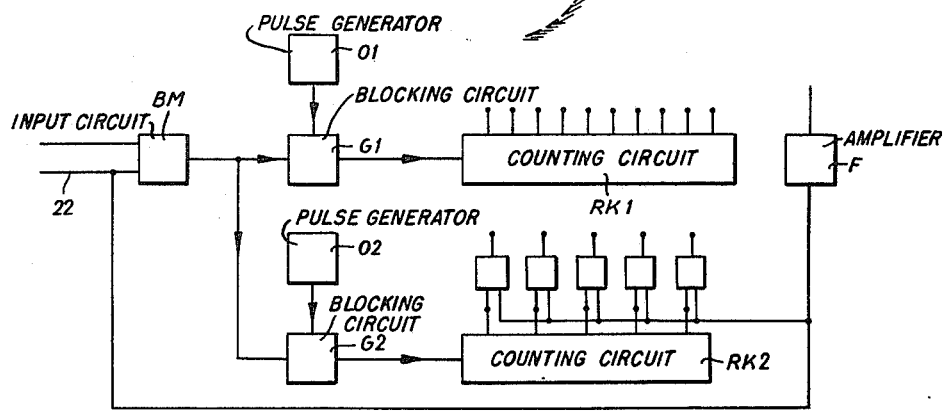
Figure 7:
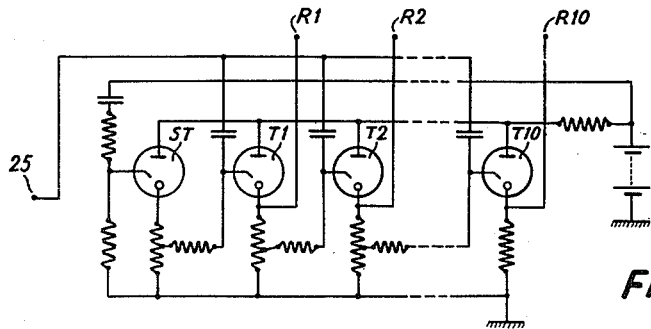
Figure 8:
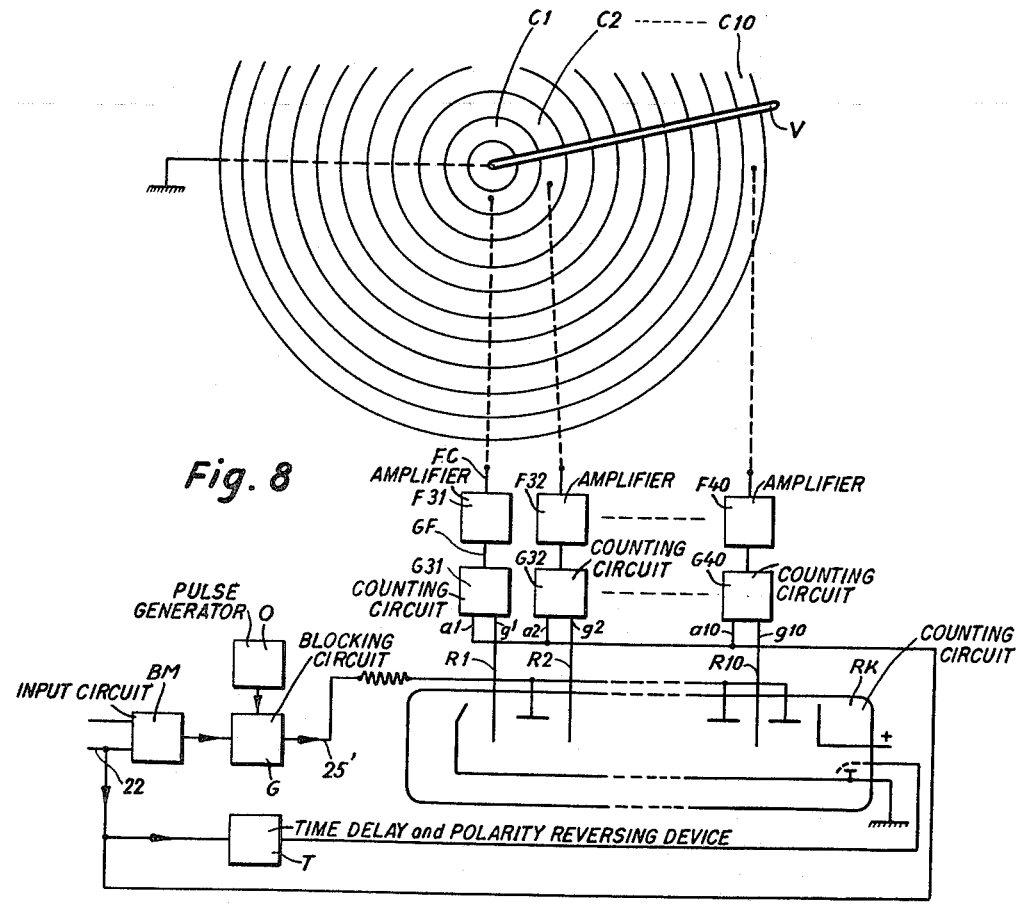
Figure 9:
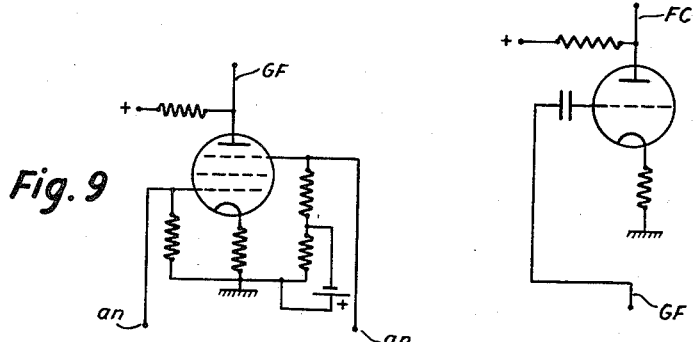
Figure 10:
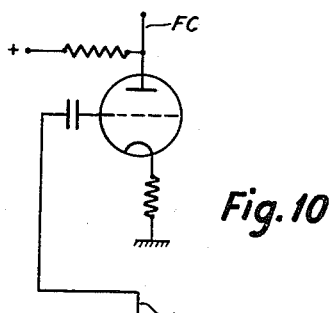

The invention will be described more in detail in connection with the attached drawings, where Fig. 1 shows a schematic image of a pulse-echo system according to the invention, Fig. 2 shows an input circuit pertaining to the system according to Fig. 1 in form of a bistable multivibrator, Fig. 3 shows a blocking circuit pertaining to the device according to Fig. 1, Fig. 4 shows a pulse generator pertaining to the system according to Fig. 1, Fig. 5 shows on a large scale a part of an indicator pertaining to a modified system according to Fig. 1, Fig. 6 shows a modification of a part of the system according to Fig. 1, Fig. 7 shows a counting circuit pertaining to the system according to Fig. 1 or Fig. 6, Fig. 8 shows a further modification of the system according to Fig. 1, Fig. 9 shows a blocking circuit pertaining to the system according to Fig. 8, and Fig. 10 shows an amplifier pertaining to the system according to Fig. 8.

The system according to Fig. 1 comprises a recording carrier 10, which from a supply 11 travels across the image to be registered with a velocity, which is a linear function of the relative spatial velocity of the system, to a take-up 12. The image may be produced on board of a ship, the velocity of the recording carrier 10 relatively the ship being then a linear function of the speed of the ship. The recording carrier 10 is given this speed via a toothed gear 13 and a driving axis 14. In the system shown in Fig. 1 the recording is electrically effected by means of an electrolytic paper (i.e. current sensible) as a recording carrier 10, which is arranged to be moved between a number (10) of concentric and electrically conductive rings $C_1 \ldots C_9$, $C_{10}$ situated in the same plane and an electrically conductive indicator V driven with a constant velocity and synchronously with a sending antenna. Contact between the rings $C_1 \ldots C_{10}$ and the indicator through the recording carrier is assumed to occur along the line M of short dashes. In order to obtain satisfactory contact between the indicator and all the rings it is suitable to shape the indicator as a number of springy tongues, one for each ring. The turning axis of the indicator V coincides with an assumed axis through the middle point of the concentric rings. The system according to Fig. 1 further comprises a counting circuit RK, a blocking circuit G, a pulse generator O, an input circuit BM and an amplifier F. The input circuit BM consists of a multivibrator known in itself, see Fig. 2, one input side 21 of which is arranged to receive a radar pulse emitted in the immediate vicinity of the system, and the other input side 22 of which is arranged to receive an echo pulse caused by said emitted radar pulse, so that on the output side 23 of the input circuit a pulse is obtained, which is a function of the distance between the system and an object in the vicinity of the system, e.g. a passing ship or a shore line. The output side 23 of the input circuit BM is connected to an input side 23 of the blocking circuit G, which consists of an electron tube connection known in itself, see Fig. 3, and it is connected between the pulse generator O and the counting circuit RK. The blocking circuit G is so dimensioned and arranged relatively to units connected to the same, that it is adjusted to opened position during the time a pulse appears on the output side 23 of the input circuit BM and therewith on the input side 23 of the blocking circuit G, i.e. during this time pulses can be transmitted from the pulse generator O to the counting circuit RK, but otherwise the circuit G blocks said pulse transmission. A positive pulse on the output side 23 and a positive pulse on a line 24 from the pulse generator O cooperate in the electron tube connection according to Fig. 3 so that a positive pulse can be selected on a line 25 between the blocking circuit G and the counting circuit RK. The counting circuit RK includes a number of steps $R_1 \ldots R_{10}$, which are connected each to a ring of the rings $C_1 \ldots C_{10}$, and which steps one at a time and in a cyclic sequence are arranged in a way known in itself, see e.g. the discharge tube connection in Fig. 7, to feed a positive pulse to the pertaining ring among the rings $C_1 \ldots C_{10}$. The amplifier F is connected between the input side 22 and the indicator V and includes a polarity reversing circuit so that starting from the echo pulse on the input side 22 an amplified polarity reversed (negative) pulse on the indicator V is obtained.

As a practical example of dimensioning it can be assumed that the indicator V is moving four revolutions/min., that the pulse generator O emits a pulse series with the pulse repeating frequency $150.10^3$ p./s., and that from the immediate vicinity of the system radar pulses are emitted with the pulse repeating frequency 200 per second. Each of the rings $C_1 \ldots C_{10}$ will thus represent a distance of 1 km. from the system.

The system described in detail in connection with Figs. 1–4 operates as follows:

From a turning radar antenna situated in the immediate vicinity and not shown in Fig. 1, radar pulses are emitted into air and to the input side 21. As a result, the bistable multivibrator BM is released and feeds a positive pulse on its output side 23, the duration of which is dependent on an echo pulse coming via a receiving antenna and arising on the input side 22 due to the emitted radar pulse. The incoming echo pulse causes a back connection of the multivibrator BM and the positive pulse on output side 23 thereof then ceases. The positive pulse produced in this way causes an opening of the blocking circuit G so that a pulse train can be transmitted from the pulse generator O to the counting circuit RK. The length of the pulse train is thus determined by the duration of the produced positive pulse. The first pulse in said pulse train causes an increase of the potential on the ring C1 via the step R1 (in the circuit according to Fig. 7 this pulse comes in to the priming electrode in the tube T1, which already has a certain bias voltage from the starting tube ST and therefore fires, causing a positive pulse to be obtained on R1 from its cathode), the second pulse in said pulse train eliminates said potential increase on the ring C1 and causes an increase of the potential on the ring C2 via the step R2 (in the circuit according to Fig. 7 this second pulse comes into the priming electrode in the tube T2, which already has a certain bias voltage from the tube T1 and therefore fires, and owing to the arising potential drop over the common anode resistance the tube T1 is extinguished) and so on. When the echo pulse comes in on the input side 22, the positive pulse to the blocking circuit G ceases and therefore the pulse train from the pulse generator O to the counting circuit RK ceases and the ring among the rings C1 . . . C10, which momentarily has a higher potential than the others, remains at said high potential. The echo pulse also comes in, amplified and polarity reversed, to the indicator V. Owing to this such a high potential difference between the indicator and the ring in question occurs that a current appears through the recording carrier which travels at a constant speed, and a marking is made. In the present case a marking over e.g. the ring C9 in the direction that the indicator V has, means thus that an object is situated at a distance of 9 km. from the device in said direction. Before or at the same time as the next radar pulse is emitted, the counting circuit RK is zero-set, e.g. by a zero-setting pulse being sent to the same (in the circuit according to Fig. 7 e.g. a negative pulse is fed to the common anode conductor of the tubes).

In the system according to Fig. 1 the rings C1—C10 are shown rather wide. To increase the precision, the number of rings can for instance be increased whereby they become correspondingly narrower. At the same time the number of steps in the counting circuit RK must, of course, be increased. However, as shown in Fig. 5, which figure shows a part of the indicator V, a number (5) of contact points K1 . . . K5 may be provided for each ring. The contact points with the same relative placing in relation to the pertaining ring (e.g. the contact points K2 for the rings C1, C2 . . . $Cn$) are coupled together and connected to an individual step in a second counting circuit RK2, see Fig. 6. These contact points are intended for fine gradation of the relatively wide rings; in the mentioned case each ring can, for instance, correspond to one km. and each contact point to 200 m. Each registering on the recording carrier will therefore consist of a relatively long dash and a dot beside this dash. This indicator V with pertaining relatively wide rings C1 . . . $Cn$ is intended to be used with a modification of the device according to Fig. 1, see Fig. 6.

The device according to Fig. 6 includes an input circuit BM, a first blocking circuit G1, a first pulse generator O1, which via said blocking circuit, when opened, is connected to a first counting circuit RK1 with a number of steps each connected to a ring of said relatively wide rings C1 . . . $Cn$, a second blocking circuit G2, a second pulse generator O2, which via said second blocking circuit, when opened, is connected to a second counting circuit RK2 (e.g. of the same type which is shown in Fig. 7) with a number of steps each connected via a counting circuit (see e.g. Fig. 3) to a group of contact points with the same relative placing in relation to the pertaining ring. The combination O1—G1—RK1 and the combination O2—G2—RK2 functions in the same way as earlier described for the combination O—G—RK in Fig. 1. Said blocking circuits are all connected to the input side 22 (where the echo pulse comes in) and transmit a pulse when an echo pulse and a pulse from a step in the counting circuit RK2 appear at the same time. The pulse generator O1 emits a pulse series with a pulse repeating frequency of for instance $150.10^3$ p./s. which means that each ring of said rings C1 . . . C2 represents a distance of 1 km., while the pulse generator O2 emits a pulse series with a pulse repeating frequency of for instance $750.10_3$ p./s., which means that each contact point within a group of contact points represents a distance of 200 m.

The system according to Fig. 6 can be modified in such a way that the steps of the counting circuit RK1 each via a blocking circuit controlled by the echo pulse are connected to the rings C1 . . . $Cn$, while the steps of the counting circuit RK2 are connected directly to the groups of contact points of the indicator V, which is, for instance, connected to ground, or to the input side 22 dependent on the polarity and the size of the pulses coming from the counting circuits RK1 and RK2. Hence it is essential that first due to the echo pulse a current is fed through the recording carrier such that a recording at that moment is obtained.

The modification shown in Fig. 8 of the system according to Fig. 1 also comprises an input circuit BM, a blocking circuit G, a pulse generator O, a counting circuit RK, a number of concentric rings C1 . . . C10 and an indicator V. The counting circuit consists, however, of a trochotron, the plates of which all are connected to the output side of the counting circuit G and the control electrodes of which (indicated R1, R2 . . . R10) are connected to a first entrance $g1, g2$ . . . $g10$ each to a counting circuit G31, G32 . . . G40 of a type known in itself, which is shown in Fig. 9. The output side 25 of the counting circuit G is in this case connected to said circuit so that from the same a series of negative pulses is obtained, for instance the output side 25' can thus be connected to the anode in a pentode, see Fig. 9, at which a pulse train with negative pulses is fed to the plates in the trochotron. A second entrance $a1, a2$ . . . $a10$ to the blocking circuits G31, G32 . . . G40 are all connected to the input side 22 of the input circuit BM. The output side of each of the blocking circuits G31, G32 . . . G40 is connected to an amplifier F31, F32 . . . F40, of a type known in itself, as shown in Fig. 10. The output side of each of the amplifiers F31, F32 . . . F40 is connected to an individual ring of said rings C1, C2 . . . C10. As shown in Fig. 9, a negative pulse on the output side of the blocking circuit is obtained when a positive pulse appears on both the first ($g1$) and the second ($a1$) entrance. Said negative pulse is amplified in the pertaining amplifier (F31) and the potential in the pertaining ring C1 is lowered so much that the arising potential difference between the ring and the indicator C, directly grounded in this embodiment, is large enough to cause a registration on the recording foil (not shown in this figure) driven at a fixed speed. Between the input side 22 and a control grid in the trochotron a time delay and polarity reversing device T is connected, by means of which the trochotron is zero-set at a predetermined time after an echo pulse has caused a registration.

The operation by the device shown in Fig. 8 is in principle the same as has been mentioned before in connection with Fig. 1. The device according to Fig. 8 can, of course, be provided with an auxiliary device according to Fig. 6 for very accurate recordings.

I claim:

1. A pulse-echo system for permanently recording the location of remote objects of the kind wherein energy pulses are transmitted and the corresponding echo pulses are detected by receiving means, the time interval being indicative of the distance of the remote objects, said system comprising, in combination, a commutator including a plurality of concentric electrically conductive rings radially spaced from each other and stationarily mounted in a common plane, an electrically conductive indicator mounted rotatable coaxially with said rings in a plane parallel to the plane of the rings and extending radially across the rings, a planar sheet of sensitized recording material sandwiched between said commutator rings and said indicator for effecting permanent recording on said sheet by a difference in potential above a predetermined value between the rings and the indicator, drive means for driving said sheet in its plane at a predetermined rate of speed, a counting chain circuit including a plurality of steps, each of said steps being connected in circuit with one of said rings for feeding pulses in a cyclic sequence to said rings, a pulse generator for feeding pulses to said counting chain circuit, blocking circuit means interposed between the counting chain circuit and the pulse generator for blocking the transmission of pulses from the pulse generator to the counting chain circuit, a first control circuit means controlled by the transmission of an energy pulse to open said blocking means, the resultant flow of pulses from said counting chain circuit to said rings effecting differential potentials below said predetermined value in cyclic sequence between the rings and the indicator, and second control circuit means controlled by the echo pulse corresponding to said energy pulse for closing the blocking means and also for feeding a pulse to the indicator, said pulse fed to the indicator causing an increase of the potential difference above said predetermined value between the indicator and the respective ring last in the cyclic sequence thereby effecting a recording on the sheet area between the indicator and the respective ring at that moment, the location of said marking being indicative of the location of the object from which said echo pulse was received.

2. A pulse-echo system according to claim 1 wherein said counting chain circuit comprises a bistable multivibrator having two inputs and an output, one of said inputs being fed with said energy pulse and the other input being fed with said echo pulse for generating an output pulse which is a function of the distance between the location of the system and the location of the object causing said echo pulse, said output pulse being fed to said blocking circuit means to open the latter for the duration of said output pulse.

3. A pulse-echo system according to claim 2 wherein said indicator is also connected to said other input of the multivibrator whereby simultaneously with the arrival of an echo pulse a change in potential with different signs is effected in the indicator and the respective ring.

4. A pulse-echo system according to claim 3 wherein said rings have a radial width in excess of the radial spacing of the rings and a plurality of parallel rows of radially spaced contact points are provided on said indicator, each row including a contact point for each ring, and further comprising a second counting chain circuit having several steps, and a second pulse generator, said second pulse generator having a higher pulse frequency than the first pulse generator, each group of contacts in the rows located in the same spatial relationship in reference to a ring being connected to each other and one of the steps of the second counting chain circuit, the steps of the second counting chain circuit being arranged to feed, one at a time in cyclic sequence, a pulse to the corresponding contact points, one for each ring the feeding of pulses from the second counting chain circuit being controlled by the second pulse generator, the transmission of pulses from said pulse generators being controlled by the arrival of an energy pulse at said one input of the multivibrator of the first counting chain circuit.

References Cited in the file of this patent
UNITED STATES PATENTS
2,467,202     Gardiner               Apr. 12, 1949